United States Patent [19]
Koike

[11] Patent Number: 5,753,366
[45] Date of Patent: May 19, 1998

[54] FISHING LINE

[75] Inventor: Mamoru Koike, Saitama, Japan

[73] Assignee: Daiwa Seiko, Inc., Tokyo, Japan

[21] Appl. No.: 593,278

[22] Filed: Jan. 29, 1996

[30] Foreign Application Priority Data

Jan. 30, 1995 [JP] Japan .................................. 7-012670

[51] Int. Cl.$^6$ ................................ D02G 3/00; A01K 91/00
[52] U.S. Cl. ........................... 428/364; 428/395; 44/44.98
[58] Field of Search .............................. 426/364, 395; 43/44.98

[56] References Cited

FOREIGN PATENT DOCUMENTS

| | | |
|---|---|---|
| 0654492 | 5/1995 | European Pat. Off. . |
| 5-43637 | 2/1993 | Japan . |
| 94-148870 | 7/1994 | WIPO . |

OTHER PUBLICATIONS

Japanese Abstract JP-A-06 264377 Sep. 20, 1994; as published by Derwent Publications Ltd., London, GB, Database WPI Section Ch, Week 9442, Class A23, AN 94-0338809.

Japanese Abstract JP-A-03 206,117 Sep. 9, 1991; as published by Derwent Publications Ltd., London, GB, Database WPI Section Ch, Week 9142, Class A23, AN 91-307351.

*Primary Examiner*—Newton Edwards
*Attorney, Agent, or Firm*—Longacre & White

[57] ABSTRACT

The present invention relates to a fishing line which has a good balance between strength and extension so that not only the fishing line is prevented from breaking in the middle of fishing but also it is easy to perform fishing operation. The fishing line of the invention characterized in that a body of the fishing line has a first characteristic in which the percentage of initial extension in a tensile force of 2.0 g/d is not lower than 10%, and a second characteristic in which the percentage of extension in a tensile force range of from 2.0 to 4.5 g/d is lower than the initial extension percentage, the percentage of extension at the time of breaking is not higher than 40%, and the breaking strength at the time of breaking is not smaller than 4.5 g/d.

5 Claims, 1 Drawing Sheet

FISHING LINE

BACKGROUND OF THE INVENTION

The present invention relates to a fishing line.

As conventional fishing lines, there are known a polyamide fishing line and a metal fishing line. Because these fishing lines are large in strength while it is low in extension percentage against a small tensile force, there is a risk that, if a fish is stricken so intensively or a fishing rod is moved so widely when the fish is hooked, the mouth of the fish or the fishing line cannot withstand the shock and may be broken so that catching the hooked fish is missed.

On the other hand, a high-extension fishing line having rubber elasticity is known. With this fishing line, however, it is difficult to pull or take in a fish under proper control, because this fishing line has a high degree of extension so that this fishing line extends so greatly against an intensive tensile force of the fish.

Further, a fishing line using a biodegradable material is disclosed in Japanese Patent Unexamined Publication No. Hei-5-43637. This fishing line is poor in balance between strength and extension, so that this fishing line is suitable for a fishing net knit like mesh but it is unsuitable for a fishing line for so-called game fishing (taste fishing) to perform line-fishing with a single fishing line.

SUMMARY OF THE INVENTION

The present invention is designed upon such circumstances and an object thereof is to provide a fishing line which is good in balance between strength and extension so that not only the line is prevented from breaking in the middle of fishing but also fishing is easy to handle.

The present invention provides a fishing line characterized in that: a body of the fishing line has a first characteristic in which the percentage of initial extension when under a tensile force of 2.0 g/d is not lower than 10%, and a second characteristic in which the percentage of extension in a tensile force range of from 2.0 to 4.5 g/d is lower than the initial extension percentage, the percentage of extension at the time of breaking is not higher than 40%, and the breaking strength at the time of breaking is not smaller than 4.5 g/d.

Here, aliphatic polyester biodegradable plastics, Nylon, polyester, etc. may be used as a material for the body of the fishing line.

In the present invention, the first characteristic which is a high extension characteristic is designed so that the initial extension percentage against a tensile force smaller than 2.0 g/d is selected to be not lower than 10%. This is because the mouth of a fish or the fishing line is broken easily by an impact force of a strike if the initial extension percentage against a tensile force of 2.0 g/d is lower than 10%.

In the present invention, the second characteristic which is a high strength characteristic is designed so that not only the extension percentage in a tensile force range of from 2.0 to 4.5 g/d is lower than the initial extension percentage of the first region but also the extension at the time of breaking is not higher than 40% and strength at the time of breaking is not smaller than 4.5 g/d. This is for the following reason. That is, if the extension percentage in a tensile force range of from 2.0 to 4.5 g/d is higher than the initial extension percentage of the first characteristic, it is difficult to quickly response to a tug in the fishing line. If the extension percentage at the time of breaking is higher than 40%, the degree of freedom in movement of the fish increases so that the time required for taking in the fish becomes long. If the strength at the time of breaking is smaller than 4.5 g/d, the fishing line cannot withstand a tug so that the fishing line may be broken easily. Incidentally, the extension percentage at the time of breaking is preferably in a range of from 15 to 40%, most preferably in a range of from 15 to 35% in order to balance first extension (extension corresponding to a relatively small tensile force acting on the fishing line when a strike is fitted) with second extension (extension for a relatively large tensile force acting on the fishing line when the fish is taken in).

In the present invention, the proportion of the first characteristic which is a high extension characteristic to the second characteristic which is a high strength characteristic, are not limited specifically.

In the present invention, it is preferable that the body of the fishing line is made by spinning biodegradable material. By using a biodegradable material as described above, fishing lines can be returned to nature when they are thrown away after used.

Here, examples of the biodegradable material which may be used include aliphatic polyesters, or the like, chemically synthesized by condensation polymerization, or the like, from glycol and aliphatic dicarboxylic acid as represented by the following chemical formula 1.

(Chemical Formula 1)

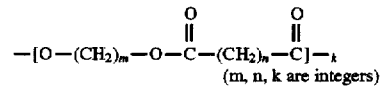

(m, n, k are integers)

In this case, the aliphatic polyesters of molecular weight set at 60 to 100 thousand (MN value) and flow ability set at 0.1 to 3.0 g/10 min (MFR value) are preferable.

Further, examples of the biodegradable material which may be used include: biodegradable chemosynthetic plastics such as polyvinyl alcohol, polycaprolactone, etc.; biodegradable fermented plastics such as polylactic acid, polyhydroxy butyrate, etc.; biodegradable natural plastics such as reaction products of cellulose and chitosan, starch, etc.; biodegradable plastics such as kneading of starch and polyvinyl alcohol; or the like. Incidentally, biodegradable plastics of the partially degradable type produced by kneading starch and polyethylene may be used.

When the aforementioned biodegradable material is to be spun, spinning is performed at such a melting temperature that the aforementioned material set to be a molecular weight (generally, a large molecular weight) exhibiting a maximum strength is not thermally decomposed. Specifically, the spinning temperature is obtained experimentally. For example, in the case of aliphatic polyesters represented by the aforementioned chemical formula 1, the spinning temperature is preferably set to be not higher than 230° C. After being subjected to the spinning, the thus spun material is generally subjected to drawing or elongation so as to obtain a fishing line. In this case, preferably, the drawing of five-to-ten times drawing ratio is carried out under thermal environment condition at 80° to 120° C., and more preferably the drawing is divided into two steps so that the first one is larger in the drawing ratio than the second one. After each drawing process, the thus drawn material or thus obtained fishing line is dipped into a cooling vessel at 10° to 25° C.

The fishing line according to the present invention is characterized in that a body of the fishing line has a first characteristic in which the percentage of initial extension in a tensile force of 2.0 g/d is not lower than 10%, and a second characteristic in which the percentage of extension in a tensile force range of from 2.0 to 4.5 g/d is lower than the initial extension percentage, the percentage of extension at the time of breaking is not higher than 40%, and the breaking strength at the time of breaking is not smaller than 4.5 g/d.

In the first characteristic which is a high extension characteristic, the initial extension percentage of the fishing line is selected to be large so that not only the shock caused by a strong strike or an excessive tug of the fishing rod when a fish is hooked can be relaxed but also the mouth of the fish or the fishing line can be securely prevented from breaking.

Further, in the second characteristic which is a high strength region, the extension percentage is low so that the fish can be pulled or taken in easily to thereby control the fish easily even in the case where a strong tensile force due to the fish acts on the fishing line.

Further, the fishing line according to the present invention has the aforementioned characteristic and the body of the fishing line is produced by spinning a biodegradable material.

By using such a biodegradable material, the fishing line is biodegraded to return to nature under the natural environment after the fishing line is thrown away after used, so that the fishing line can be prevented from doing harm to living beings and from exerting bad influence on the environment.

DETAILED DESCRIPTION OF THE PREFERRED EMBODIMENT

An embodiment of the present invention will be described below specifically with reference to the drawings.
(Example 1)

Figure 1:
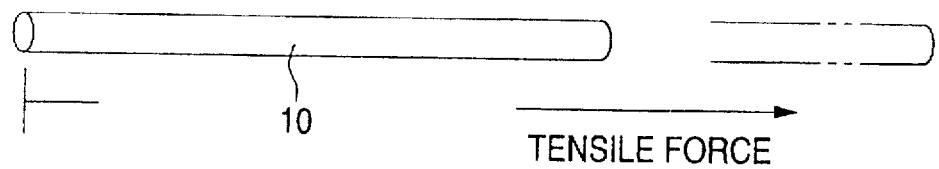
FIG. 1 is an explanatory view showing an embodiment of the fishing line according to the present invention.
Figure 2:
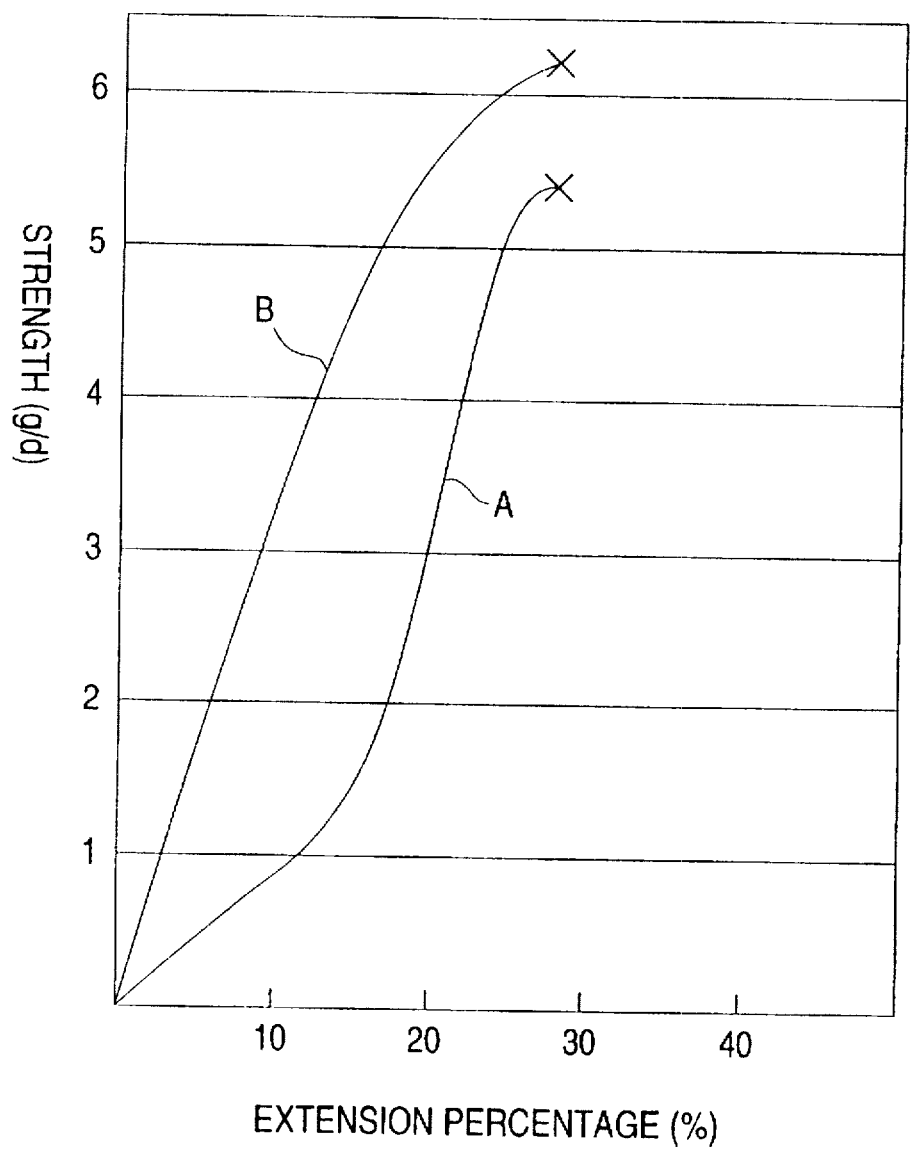
FIG. 2 is a graph showing the relation between strength and extension percentage concerning the fishing line.

FIG. 1 is a view showing an example of the fishing line according to the present invention. This fishing line 10 was made of aliphatic polyester biodegradable plastics in which the relation between strength and expansion exhibited the curve A in FIG. 2 when a tensile force acted on the fishing line 10 in the direction of the arrow in FIG. 1. That is, in this fishing line 10, the initial extension percentage (elongation/amount of nitial extension relative to original length) for a tensile force of 2.0 g/d was 18%, the subsequent extension percentage in a tensile force range of from 2.0 to 4.5 g/d was 5%, the extension percentage at the time of breaking was 27% and the tension at the time of breaking was 5.4 g/d. Incidentally, at this time, the temperature for spinning the aliphatic polyester biodegradable plastics was selected to be 210° C. First and second drawing processes were set at three and four times, respectively, so that the total of seven drawing times were carried out under thermal environment condition at 100° C. Temperature of each cooling vessel was set at 12° C.

When this fishing line was used for fishing, it was confirmed that there was no line break in the middle of fishing and that the fishing was easy to handle when a fish was hooked.
(Comparative Example 1)

A Nylon fishing line was prepared so that the initial extension percentage against a tensile force smaller than 2.0 g/d was 5%, the extension percentage in a tensile force range of from 2.0 to 4.5 g/d was 4%, the extension percentage at the time of breaking was 13% and the strength at the time of breaking was 6.5 g/d.

When this fishing line was used for fishing, the impact force on a strike was strong so that the mouth of a fish was broken or the fish vomits up bait.
(Comparative Example 2)

A Nylon fishing line was prepared so that the initial extension percentage against a tensile force smaller than 2.0 g/d was 13%, the extension percentage in a tensile force range of from 2.0 to 4.5 g/d was 20%, the extension percentage at the time of breaking was 38% and the strength at the time of breaking was 6.5 g/d.

When this fishing line was used for fishing, it was impossible to quickly respond to a tug of a fish so that an obstacle was constituted for the fishing operation.
(Comparative Example 3)

A polyester fishing line was prepared so that the initial extension percentage for a tensile force smaller than 2.0 g/d was 18%, the extension percentage in a tensile force range of from 2.0 to 4.5 g/d was 5%, the extension percentage at the time of breaking was 55% and the strength at the time of breaking was 6.5 g/d.

When this fishing line was used for fishing, the degree of freedom in movement of a fish increased to prolong the time required for taking in the fish, so that this fishing line could not respond to a particularly strong tug.
(Comparative Example 4)

A polyester fishing line was prepared so that the initial extension percentage for a tensile force smaller than 2.0 g/d was 16%, the extension percentage in a tensile force range of from 2.0 to 4.5 g/d was 7%, the extension percentage at the time of breaking was 30% and the strength at the time of breaking is 3.0 g/d.

When this fishing line was used for fishing, the fishing line could not bear a tug of a fish so that the fishing line was broken to make the fishing operation difficult.
(Conventional Example)

A fishing line of a polyamide material was prepared so that the initial extension percentage for a tensile force of 2.0 g/d was 7%, the extension percentage in a tensile force range of from 2.0 to 4.5 g/d was 8%, the extension percentage at the time of breaking was 27% and the strength at the time of breaking was 6.5 g/d. In this fishing line, the relation between strength and extension percentage exhibited the curve B in FIG. 2 when a tensile force acted on the fishing line in the direction of the arrow in FIG. 1.

When this fishing line was used for fishing, there was no line break but it was difficult to perform fishing operation.
(Comparative Example 5)

Polyester type biodegradable plastics represented by the chemical formula 1 was used as a biodegradable material and a fishing line was prepared by spinning this material at 250° C. The spinning temperature is so high that the strength of this fishing line at the time of breaking was lowered to 3.8 g/d because of thermal decomposition of the material.

EFFECT OF THE INVENTION

As described above, the fishing line according to the present invention is designed so that a body of the fishing line has a first characteristic in which the percentage of initial extension in a tensile force of 2.0 g/d is not lower than 10%, and a second characteristic in which the percentage of extension in a tensile force range of from 2.0 to 4.5 g/d is lower than the initial extension percentage; the percentage of extension at the time of breaking is not higher than 40%; and the breaking strength at the time of breaking is not smaller than 4.5 g/d. Accordingly, not only the fishing line is prevented from breaking in the middle of fishing but also it is easy to perform fishing operation.

Further, because the fishing line according to the present invention is designed so that the body of the fishing line has the aforementioned characteristic and is produced by spinning a biodegradable material, the fishing line does not exert bad influence on the environment, that is, the fishing line is gentle to the environment.

What is claimed is:

1. A fishing line comprising a body, having an original length, wherein said body extends at least 10% relative to said original length when subject to a first tensile load of 2.0 g/d and when subject to an increased load within a range between 2.0 g/d to 4.0 g.d thereafter extends less than an additional 10% wherein the breaking strength at the time of breaking is not smaller than 4.5 g/d and at said time of breaking said body extends less than 40%.

2. A fishing line according to claim 1, wherein said body of said fishing line is produced by spinning a biodegradable material.

3. A fishing line according to claim 2, wherein the spinning temperature for the biodegradable material is set not greater than 230° C.

4. A fishing line according to claim 3, wherein the biodegradable material is comprised of aliphatic polyesters.

5. A fishing line comprising a body having an original length, wherein said body extends at least 10% relative to said original length when subject to a first tensile load of 2.0 g/d and when subject to an increased tensile load within a range between 2.0 g/d to 4.5 g/d thereafter extends less than an additional 10%.

* * * * *